United States Patent
Takae et al.

(10) Patent No.: US 7,457,610 B2
(45) Date of Patent: Nov. 25, 2008

(54) CONTENT PROVIDING METHOD, A REGISTRATION METHOD OF A USER MENU INFORMATION DATABASE, A CONTENT PROVIDING PROGRAM, A CONTENT REQUESTING PROGRAM, A USER REGISTRATION PROGRAM, AND A CHARGE INVOICING PROGRAM

(75) Inventors: Naohito Takae, deceased, late of Suginami (JP); by Yumiko Takae, legal representative, Suginami (JP); Hiroyuki Tani, Sapporo (JP); Hiroyuki Omiya, Aomori (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/647,650

(22) Filed: Aug. 26, 2003

(65) Prior Publication Data
US 2004/0081300 A1 Apr. 29, 2004

(51) Int. Cl.
*H04M 11/00* (2006.01)
*H04M 15/00* (2006.01)
*H04M 3/42* (2006.01)
*H04Q 7/20* (2006.01)

(52) U.S. Cl. ............... 455/406; 455/435.1; 379/114.01; 379/201.05

(58) Field of Classification Search ... 455/435.1–435.3, 455/405–410, 414.2, 414.3; 379/112.01, 379/114.01, 120, 127.01, 133–134, 201.05
See application file for complete search history.

(56) References Cited

U.S. PATENT DOCUMENTS 5,642,398 A * 6/1997 Tiedemann et al. ...... 455/426.1
5,793,852 A   8/1998 Kang et al.
6,190,178 B1  2/2001 Oh
6,785,538 B2 * 8/2004 Nihei ...................... 455/414.1
6,957,199 B1 * 10/2005 Fisher ........................ 705/78

(Continued)

FOREIGN PATENT DOCUMENTS

EP    0 923 036 A1    6/1999

(Continued)

OTHER PUBLICATIONS

Hiroshi Kakii, "Marugoto Zukai Saishin i-mode ga wakaru", 1st Edition, Kabushiki Kaisha Gijutsu Hyouronsha, Aug. 24, 2000, pp. 108, 109, 112 and 113.

(Continued)

*Primary Examiner*—Quoc D Tran
(74) *Attorney, Agent, or Firm*—Staas & Halsey LLP (57) ABSTRACT

According to the present invention, a user's portable telephone 11 accesses a content provider 19 (S1); if the user's portable telephone 11 is registered in a user menu information database 35, a requested content service is immediately provided (S2); if it is unknown whether the portable telephone 11 is registered in the user menu information database 35, a request is made of a communications carrier 31 that it be determined whether the user is registered in the user menu information database 35; if the user's portable telephone is not registered, a request to perform registration is made (S3); the communications carrier 31 provides information that the user's portable telephone 11 is now registered (S6); and the requested content service is provided to the user's portable telephone 11 (S2).

11 Claims, 6 Drawing Sheets

U.S. PATENT DOCUMENTS

| | | | |
|---|---|---|---|
| 7,136,631 B1* | 11/2006 | Jiang et al. | 455/414.1 |
| 2001/0005890 A1* | 6/2001 | Nitaki | 713/202 |
| 2002/0009996 A1* | 1/2002 | Okada et al. | 455/435 |
| 2002/0046353 A1* | 4/2002 | Kishimoto | 713/202 |

FOREIGN PATENT DOCUMENTS

| | | |
|---|---|---|
| EP | 1 026 853 A1 | 8/2000 |
| JP | 2000-78129 | 3/2000 |
| JP | 2000333258 A * | 11/2000 |
| JP | 2001-27874 | 1/2001 |
| WO | 00/65812 | 11/2000 |

OTHER PUBLICATIONS i-mode de Jikan to Okane w toku suru 100 no Chie, Shukan Diamon, Extra Issue, Kabushiki Kaisha Diamon sha, Jul. 19, 2000, pp. 28-29.

"Mobile de iko!", PC Style 21, vol. 1, No. 2, Kabushiki Kaisha Mainichi Communications, Jan. 18, 2000, pp. 162-165.

Japanese Office Action issued Sep. 16, 2008 in corresponding Japanese Application No. 2001-055736.

Hiroshi Kakii, Illustrated Guide to the Latest I-Mode, K.K. Gijutsu Hyoron-sha, Aug. 24, 2000, First Ed. pp. 77-113.

* cited by examiner

CONTENT PROVIDING METHOD, A REGISTRATION METHOD OF A USER MENU INFORMATION DATABASE, A CONTENT PROVIDING PROGRAM, A CONTENT REQUESTING PROGRAM, A USER REGISTRATION PROGRAM, AND A CHARGE INVOICING PROGRAM

BACKGROUND OF THE INVENTION

1. Field of the Invention

The present invention generally relates to a content providing method, a registration method of a user menu information database, a content providing program, a content requesting program, a user registration program, and a charge invoicing program.

2. Description of the Related Art

With the recent development and spread of the "network society", Internet content services, previously available only for personal computers and the like, are now made available for portable telephones, such as i-mode (registered trademark) terminals.

Internet content services include free-of-charge services and billable services. Payment methods for the latter case include a direct payment to a content provider by a credit card, a bank transfer, and so on; and a proxy payment by a communications carrier serving as a payment proxy, wherein content charges are added to portable telephone service charges, and the communications carrier pays the content charges to the content provider on behalf of a content user.

Figure 1:
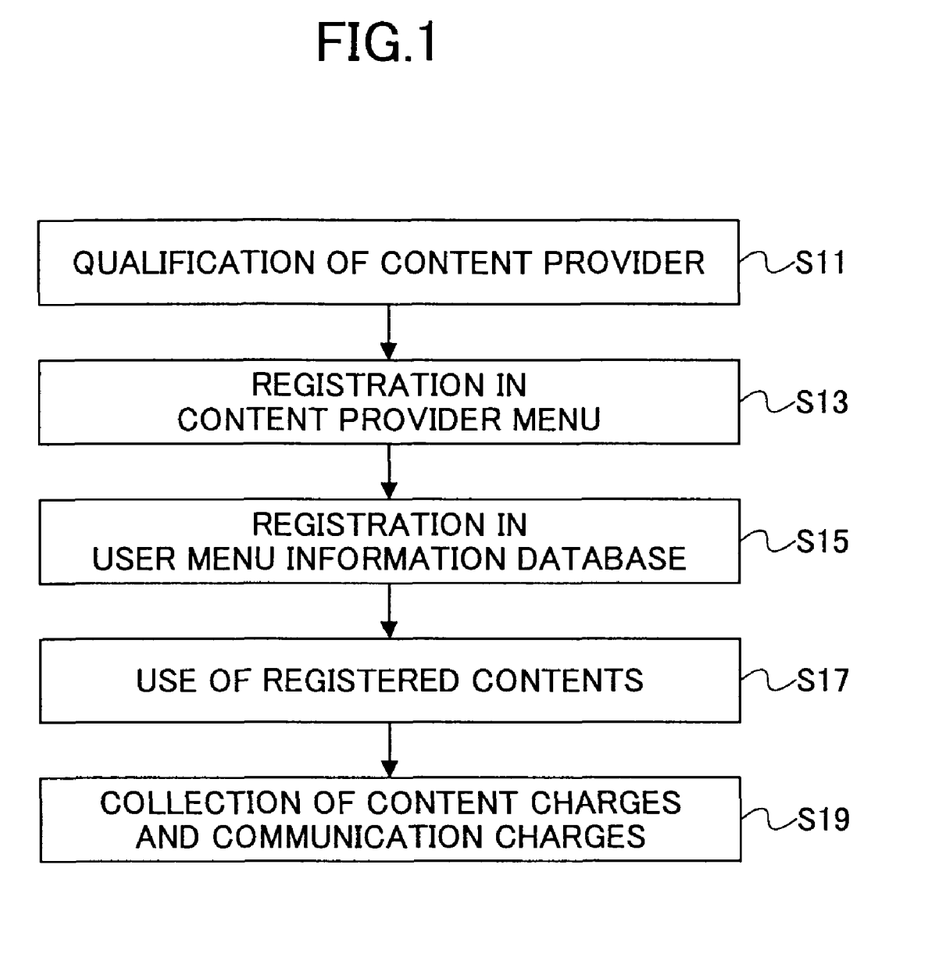
FIG. 1 is a flow diagram for explaining how a proxy payment service is provided.

The method of executing the proxy payment to the content provider includes five steps as follows, as shown in FIG. 1.

(1) The communications carrier determines whether a content provider that desires the payment proxy service is qualified. The content provider must pass the determination be found qualified to enjoy the proxy payment service (S11).

(2) The content provider who passes the determination registers content services that are offered in a content provider menu information database of the communications carrier (S13).

(3) A user who wishes to use the proxy payment service selects and registers content services that the user wishes to use from the content services listed in the content provider menu information database. The content services that the user registers are listed in a user menu information database (S15).

Here, the registration in the user menu information database is performed, for example, by contracting with a billable site, registering a push-type site, and registering a frequently-visited site.

(4) Then, the user views a list of the content services that are registered in the user menu information database. Since the registered content services, the list of which is displayed, are linked, content can be accessed as desired (S17).

(5) The communications carrier adds the user's portable telephone service charge to the content charges of the billable content services, collects, and makes a proxy payment to content providers as appropriate (S19).

Figure 2:
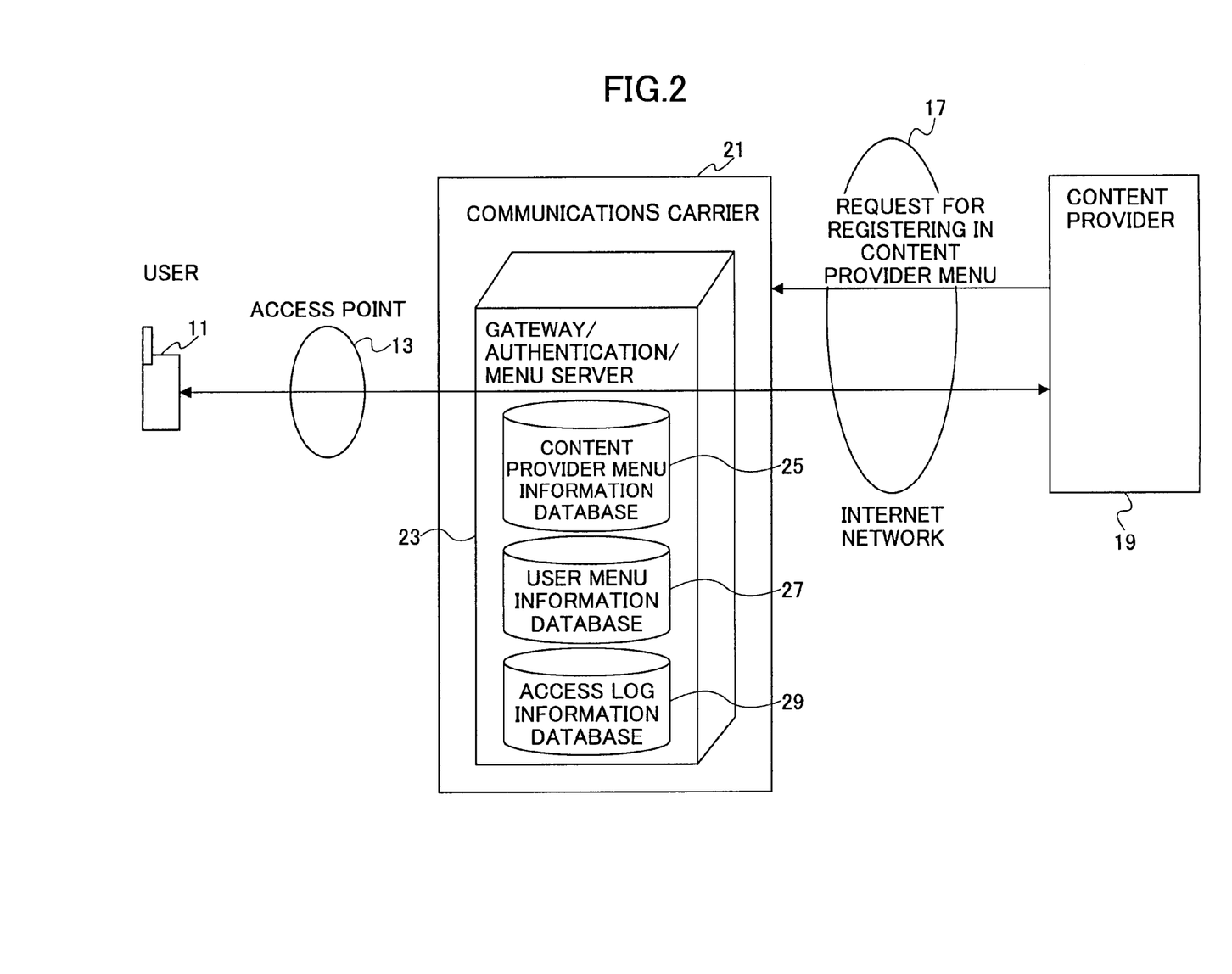
FIG. 2 is a schematic diagram for explaining use of content services according to the conventional technology.

Conventional use of the content providing method is explained using FIG. 2. FIG. 2 shows a user's portable telephone 11, an access point 13, a communications carrier 21, the Internet 17, and a content provider 19.

When a communication service is used, the access point 13 serves as a node for the user's portable telephone 11, connecting it to a network. The communications carrier 21 is provided with a gateway/authentication/menu server 23 for connecting the communication network of the communications carrier with the Internet 17. The user's portable telephone 11 is connected to the Internet 17 and the content provider 19 on the Internet 17 through the access point 13 and the gateway/authentication/menu server 23.

The gateway/authentication/menu server 23 functions as a gateway switch to the Internet 17, performs user authentication with reference to a user information database (not shown), enables use of the content services by the user and performs invoicing of the communication charge, the content charge for the content services used by the user, and the like, using the content provider menu information database 25, the user database 27, and the access log information database 29.

The content provider 19 provides the user's portable telephone 11 with content services through the communications carrier 21. The content services of the content provider 19 are registered in the communications carrier's content provider menu information database 25 by performing a registration request for the content provider's menu. When the content services are registered in the content provider menu information database 25, the content services are displayed in a "Menu list" of a "Menu screen" of the user's portable telephone, as content services in specific categories.

That is, the registered content services are categorized into, for example, "News/weather/information", "Mobile banking", "Credit card /security/insurance", etc., and displayed in a list according to each category.

The user's portable telephone 11 displays the "Menu screen" by being appropriately operated using an "Initial screen". Then, "Menu list" is selected from the "Menu screen", and a desired category is selected. Then, the content services (content providers) registered in the communications carrier's content provider menu information database 25 are displayed in a list according to the category. The user selects and accesses the desired content service (content provider) from the list. The user then registers his/her subscription to a service in a "Registration screen" provided by the content provider, which is registered in the user menu information database 27, and the content service can be used. In addition, billable content services displayed in the "Menu list" cannot be used unless a proper registration is completed.

The content services registered in the user menu information database 27 are displayed in a "My menu" screen that is displayed with the "Menu list" in the "Menu screen" of the user's portable telephone 11.

In this manner, the user can directly select a content service from the content services displayed in "My menu", which are registered in the user menu information database 27, without having to select a content service from the "Menu list".

The access log information database 29 stores all of the access logs for every user. Based on the data of the access log information database 29, the communications carrier 21 adds billable content charges to the communication service charge, and issues an invoice to the user accordingly.

In addition, the communications carrier 21 consummates an agreement with content providers such that when a user does not pay for the billable content services, the communications carrier is not obliged to pay the content providers, and thereby avoids a risk associated with proxy payment transactions.

In this manner, the user can enjoy one-window payment through the proxy payment service, which is more convenient than the case where a credit card is used, with an added advantage that uneasiness and various problems are avoidable. However, since the billable content services for which the user can use the proxy payment service are limited to the content services registered in the communications carrier's content provider menu information database 25, a payment from a user to a content provider has to be directly made for billable content services that are not registered.

Further, since a portable telephone is being considered, the number of menus that can be registered is limited. For this reason, there is a limitation in the number of content services for which the proxy payment can be offered.

Further, a user who wishes to use the proxy payment service selects a desired content service from the content services registered in the content provider menu information database 25, and the user is registered in the user menu information database 27. However, even after the user is registered, when the registration screen is displayed and the user attempts to perform registration, the user may receive a warning of "Duplicate registrations".

That is, the conventional portable telephone displays the registration screen, even after the user is already registered, possibly causing the user to attempt an unnecessary duplicate registration.

SUMMARY OF THE INVENTION

The present invention is made in view of the above conventional problems, eliminating the limitation in content services for which the user can use the proxy payment service, and avoiding useless operations by the user.

The present invention provides means for solving the conventional problems, and has the following features.

Figure 3:
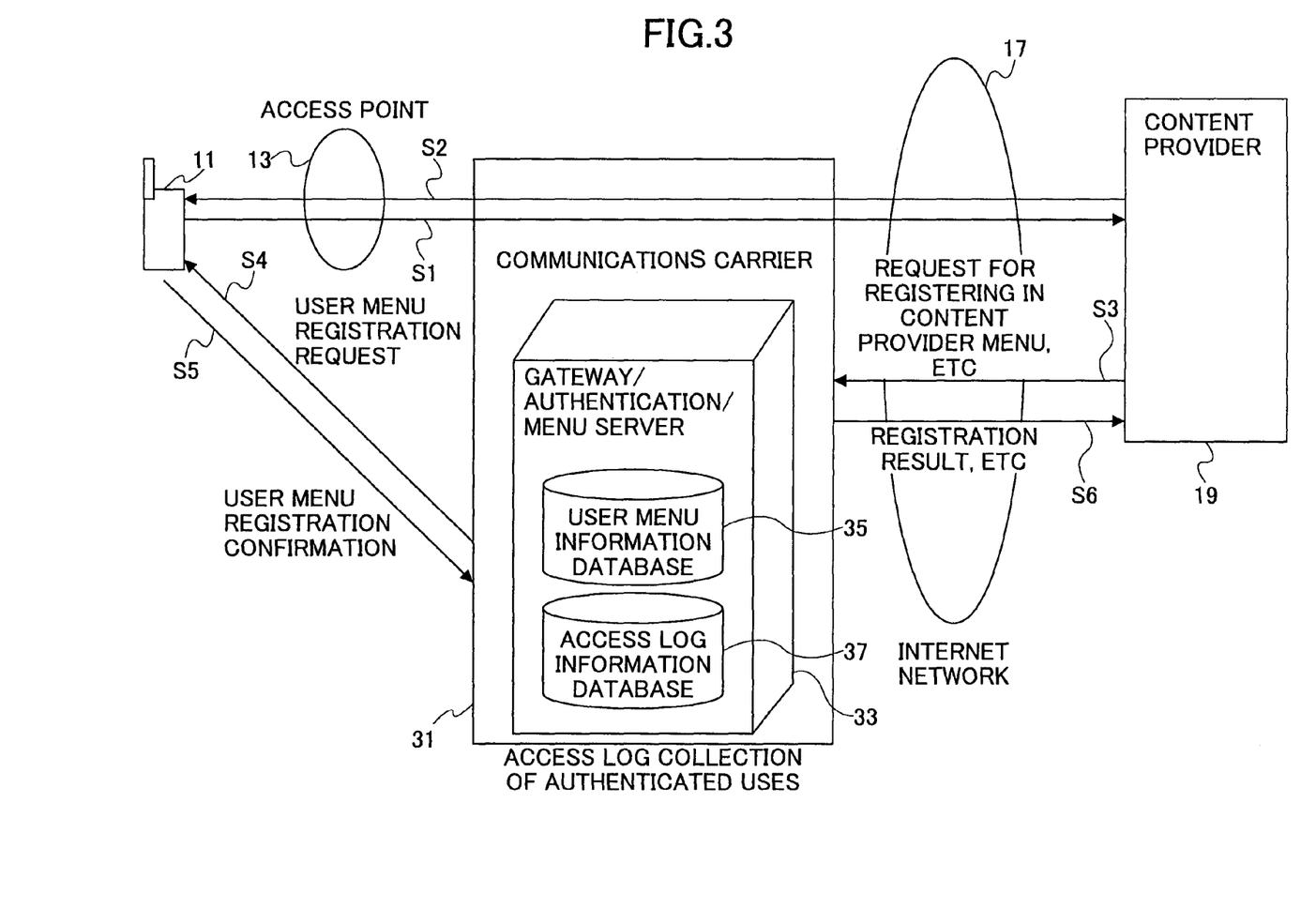
FIG. 3 is a schematic diagram for explaining a content services use method according to the present invention.

Claim 1 of the present invention provides a content providing method of a content provider (such as the content provider 19 as shown in FIG. 3), whereby a requested content service is provided to a user's portable telephone when a menu registration identifier, which indicates that the user's portable telephone is registered for the requested content service in a user menu information database (such as the user menu information database 35 as shown in FIG. 3) of a communications carrier, is contained in a content-requesting signal transmitted from the user's portable telephone to the content provider.

According to the invention described by claim 1, when the menu registration identifier, which indicates that the user's portable telephone is registered in the user menu information database, is contained, the limitation on content services that can use proxy payments is eliminated, and useless operations are dispensed with, by providing the user's portable telephone with the requested content service.

Claim 2 provides a content providing method of the content provider, whereby the communications carrier (such as the communication carrier 31 as shown in FIG. 3) is requested to register the user's portable telephone in the user menu information database, when the menu registration identifier, which indicates that the user's portable telephone is registered in the user menu information database of the communications carrier for the requested content service, is not contained in the content-requesting signal transmitted from the user's portable telephone to the content provider.

According to the invention described by claim 2, the registration process is carried out even when the content-requesting signal transmitted from the user's portable telephone does not contain the menu registration identifier, which menu registration identifier indicates that the user is registered for the requested content service in the user menu information database. In this manner, the user does not have to perform useless registration when he/she is already registered.

Claim 3 provides a registration method for the user menu information database of the communications carrier, in which the user is requested to process his/her registration, the menu registration identifier is added to the content-requesting signal, which content-requesting signal contains the user identification information and the content identifier received from the content provider when the user completes registration in the user menu information database, the content-requesting signal is transmitted to the content provider, and the content provider requests registration of the user in the user menu information database, pursuant to receiving the content-requesting signal from the user's portable telephone.

According to the invention described by claim 3, the communication carrier, when requested to perform registration of the user who is not already registered in the user menu information database, determines whether the user is registered in the user menu information database. If the user is not registered, the user is registered in the user menu information database, the menu registration identifier is added to the content-requesting signal, and the content-requesting signal is transmitted to the content provider. In this manner, if the user is already registered, the user does not have to perform the registration process uselessly.

Claim 4 of the present invention provides the registration method for the user menu information database as claimed in claim 3, wherein the menu registration identifier is added to the content-requesting signal, which contains the user identification information and the content identifier received from the content provider, and the content-requesting signal is transmitted to the content provider, if the user is registered in the user menu information database.

According to claim 4, if the user is registered in the user menu information database, the menu registration identifier is added to the content-requesting signal, which contains the user identification information and the content identifier received from the content provider, and the content-requesting signal is transmitted to the content provider. In this manner, the limitation of the content services for which the user can use the proxy payment service is eliminated, and useless operations by the user are no longer required.

Claim 5 of the present invention provides a content providing program that is executable by a computer, the content providing program including a receiving step for receiving the content-requesting signal transmitted by a user's portable telephone, the menu identifier determining step for determining whether the content-requesting signal contains the menu registration identifier indicating that the user is registered in the user menu information database that registers users of every content service, the user menu information database being prepared by the communications carrier, and a content providing step for providing the user with the content service when the menu identifier determining step determines that the menu registration identifier is contained in the content-requesting signal.

Claim 6 of the present invention provides the content providing program as claimed in claim 5, further including a requesting step for requesting the user to register in the user menu information database of the communications carrier when the menu identifier determining step determines that the menu registration identifier is not contained in the content-requesting signal.

Claims 5 and 6 specify the content providing programs suitable for realizing the content providing methods of the content provider described by claims 1 and 2.

Claim 7 of the present invention provides a content requesting program of the communications carrier, the program being computer-executable, which includes a transmitting step for adding the menu registration identifier, which indicates that the user is registered in the user menu information database, to the content-requesting signal that requests a content service of the content provider, the content-requesting signal being transmitted by the user accessing the content service by selecting a desired content service from a content services list displayed on a user menu, and transmitting the content-requesting signal to the content provider.

The invention described by claim 7 specifies the content-requesting program of the communications carrier.

Claim 8 of the present invention provides a user registration program of the communications carrier, which is computer-executable, and includes a registration request processing step for the content provider requesting that the user be registered in the user menu information database, the content provider receiving the content-requesting signal from the user's portable telephone, a registration step for registering the user's portable telephone in the user menu information database, and a transmitting step for adding the menu registration identifier to the content-requesting signal, which contains the user identification information and the content identifier received from the content provider, and transmitting the content-requesting signal to the content provider.

Claim 9 of the present invention provides the user registration program of the communications carrier as claimed in claim 8, wherein the transmitting step adds the menu registration identifier to the content-requesting signal, which contains the user identification information and the content identifier received from the content provider, without performing registration request processing of the user, and transmits the content-requesting signal to the content provider, if the user is already registered in the user menu information database.

The present invention described by claims 8 and 9 specify the user registration programs suitable for the user menu information database registration methods of the communications carrier described by claims 3 and 4.

Claim 10 of the present invention provides an invoicing program of the communications carrier, where an access log information database is installed for collecting logs about communications and use of content services, the invoicing program including a step for adding content charges to communication charges of the user with reference to the access log information database and the user menu information database that registers the user using the user registration programs according to claims 8 and 9.

The present invention described by claim 10 specifies the charge invoicing program of the communications carrier.

DESCRIPTION OF THE PREFERRED EMBODIMENTS

Next, a preferred embodiment of the present invention is explained with reference to the attached drawings.

FIG. 3 is a schematic diagram for explaining a content services use method according to the present invention. FIG. 3 includes a user's portable telephone 11, an access point 13, a communication carrier 31, the Internet 17, and a content provider 19.

The user's portable telephone 11, the access point 13, the Internet 17, and the content provider 19 in FIG. 3 are the same as the user's portable telephone 11, the access point 13, the Internet 17, and the content provider 19 in FIG. 2, respectively.

The communications carrier 31 includes a user authentication/menu server 33 for connecting to the Internet 17 in a communications network. The user authentication/menu server 33 performs user authentication with reference to a user information database (not shown), enables use of information content services by the user's portable telephone 11 through a user menu information database 35 and an access log information database 37, and adds content charges relative to use of billable content services to a communications service charge of the user's portable telephone 11.

According to the embodiment of the present invention, the content provider menu information database 25 as shown in FIG. 2 is not used for the user authentication/menu server. However, the communications carrier 31 can add the content services charge to the communication service charge by using the user menu information database 35 and the access log information database 37. Therefore, even if a content service is not registered in the content provider menu information database 25 as shown in FIG. 2, an invoice can be prepared for such unregistered content services provided to the user's portable telephone 11.

The outline of providing content services in the present invention is explained using FIG. 3.

(1) The user accesses the content provider 19. The following are available as methods of access (S1).

(a) "Menu list" is selected from "Menu screen", a desired category is selected, and, then, a desired content service is selected.

(b) "My menu" is selected from "Menu screen", and a desired content service is selected from content services displayed.

(c) A URL (Uniform Resource Locator) of a desired content provider is directly input.

(2) Next, the content provider 19 performs the following two processes based on the access method of the user's portable telephone 11.

(a) In the case of (1) (b), the content provider 19, since the user's portable telephone 11 is registered in the user menu information database 35 about the content services, the selected content service can be immediately provided (S2).

(3) In the cases of (1) (a) and (1) (c), whether the user's portable telephone 11 is registered in the user menu information database 35 about the content services cannot be determined. Accordingly, a request is made of the communications carrier 31 to determine whether the user is registered in the user menu information database 35. If the user is not registered, then, a request for registration is provided (S3).

(4) The communications carrier 31 receives the request from the content provider 19, and determines whether the user is registered in the user menu information database 35.

(a) If the user is not registered, a request for registration is made for the user's portable telephone 11 (S4).

(b) When the user's portable telephone 11 performs a registration process, the user is registered in the user menu information database 35.

Otherwise, if the user is registered, the process proceeds to (5).

(5) Then, the communications carrier 31 provides the content provider 19 with information that the requested registration is completed in the user menu information database 35 (S6).

(6) Since the user's portable telephone 11 is registered in the user menu information database 35 about the content services, the content provider 19 provides the content service that is requested (S2).

(7) Then, the communications carrier adds the user's content charges to the portable telephone service charge with reference to the access log information database 37, and provides the proxy payment to the content provider 19.

Figure 4:
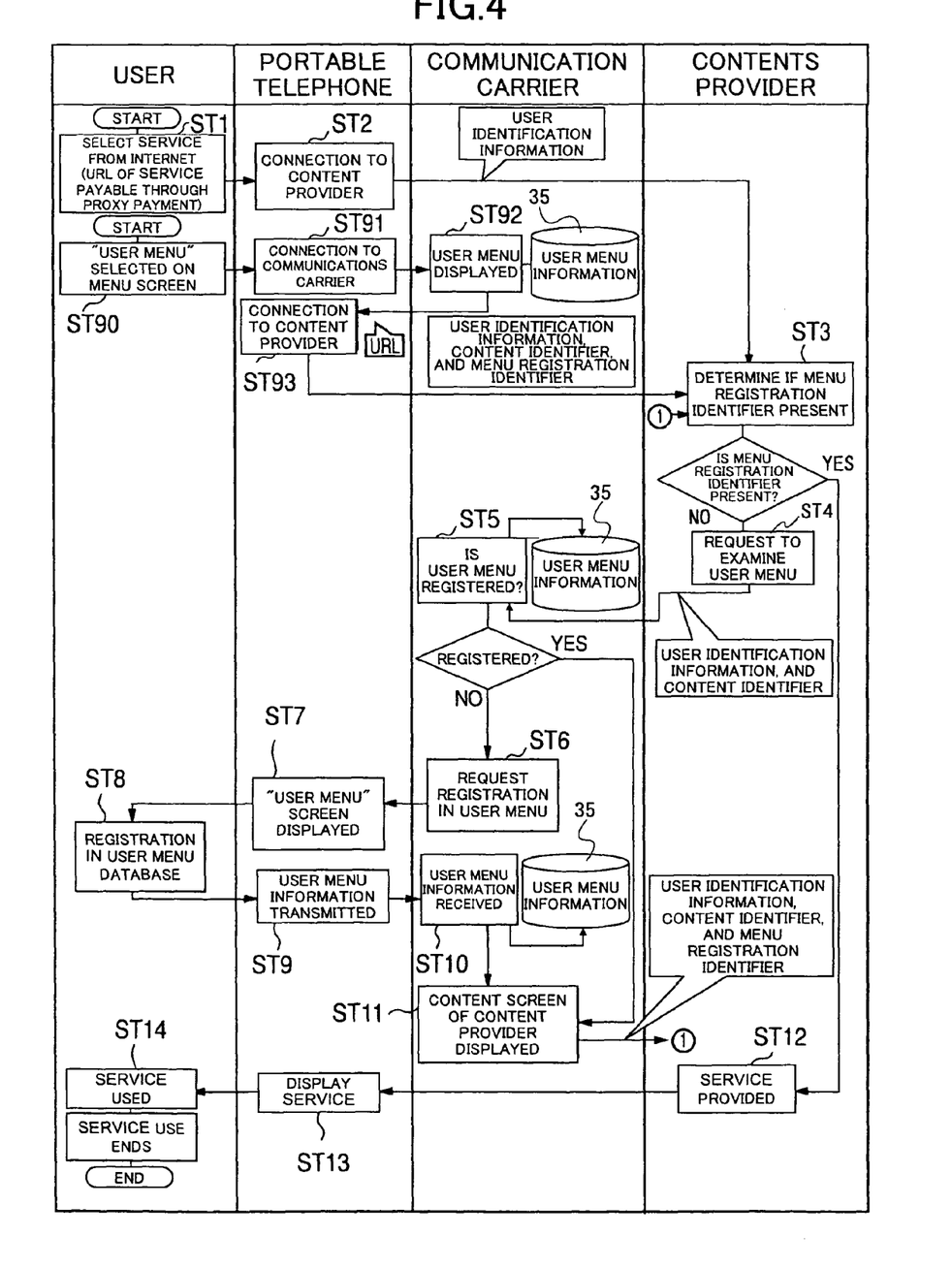
FIG. 4 is a flow diagram for explaining embodiments of the present invention.

Next, the embodiment of the present invention is explained with reference to FIG. 4. FIG. 4 shows a processing flow among the user's portable telephone 11, the server 33 of the communications carrier 31, and the content provider (including content services) 19.

(Accessing the Content Provider)

The user accesses the content provider 19. The following methods are available for accessing.

(1) The user starts a browser of the user's portable telephone 11, and directly inputs a URL of the content provider 19 (ST1). Then, the user's portable telephone 11 is connected to the content provider 19. At this time, the content provider 19 receives user identification information (subscriber ID) of the user's portable telephone 11 from the user's portable telephone 11.

(2) The user starts the browser of the user's portable telephone 11. "User menu" ("My menu") is selected from "Menu screen" (ST90). Then, the portable telephone 11 is connected to the communications carrier 31. At this time, the user identification information of the user's portable telephone 11 is provided to the server 33 of the communications carrier 31 from the user's portable telephone 11. The server 33 of the communications carrier 31 generates a screen listing content providers that the user's portable telephone 11 has registered with reference to the user menu information database 35 based on the user identification information, and transmits the screen to the user's portable telephone 11. Then, "User menu" is displayed in the display screen of the user's portable telephone 11 (ST92). The user selects a desired content provider from the content providers displayed in the list, and further selects a desired content service. Since a link is provided to the content service, a connection is automatically made to the desired content service (ST93). At this time, the content provider 19 receives the user identification information, content identifier, and menu registration identifier of the user's portable telephone 11 from the user's portable telephone 11. The menu registration identifier is an identifier as to whether registration is made in the user menu information database 35 (in addition, this identifier serves as an identifier as to whether the user menu information database 35 is accessed). When the user's portable telephone 11 accesses the content service from "User menu", the content identifier is added.

(3) In the case that access is made by selecting a registered content service, after selecting a desired category from "Menu list" of "Menu screen", although the connection is made via the server 33 of the communications carrier 31, the user menu information database 35 is not referred to. For this reason, whether the user is registered in the user menu information database 35 about the content services is unknown. In this case, the user identification information and the content identifier of the user's portable telephone 11 are provided from the user's portable telephone 11 to the content provider 19; however, the menu registration identifier is not provided.

(Display of Contents)

When the content provider 19 receives a signal transmitted from the user's portable telephone 11 (i.e., access is made), which requests a content service of the content provider, it is determined whether the menu registration identifier is contained in the signal of the access (ST3). If the menu registration identifier is contained (YES at ST3), since the access is from the user's portable telephone 11 that is already registered in the user menu information database 35 about the content services, the content services are offered (ST12). The user's portable telephone 11 displays a list of the content services (ST13), and the user can use the content services (S14).

In the case that it is not registered at the beginning of the access, the user' portable telephone 11 can be registered in the user menu information database 35 by a process of the communications carrier 31, as described below. Then, it is determined that the menu registration identifier is contained, and the content services are provided.

(Registration in the User Menu Information database)

The content provider 19 determines whether a signal transmitted from the user's portable telephone 11, requesting a content service of the content provider, contains the menu registration identifier (ST3). If the menu registration identifier is not contained (NO at ST3), whether the user's portable telephone 11 is registered in the user menu information database 35 about the content services is unknown. Then, a request is made to the communications carrier 31 for determining whether the user 11 is registered in the user menu information database 35. If the user 11 is not registered, a request is made for processing the registration (ST4). The signal of the request contains information of the user identification number and the content identifier.

The communications carrier 31 determines whether the user 11 is registered for the content services concerned with reference to the user menu information database 35 based on the requested user identification number (ST5).

If the user 11 is registered for the content services concerned (YES at ST5), the screen of the user's portable telephone 11 displays a screen that the content provider provides (ST11), and the process returns to ST3, where the menu registration identifier is examined. At this time, the user identification information, the content identifier, and the menu registration identifier of the user's portable telephone 11 are provided to the content provider 19. Hereafter, the content services are provided to the user 11, like the case wherein it is determined, at the process ST3, that the menu registration identifier is contained in the content-requesting signal (YES at ST3).

On the other hand, if it is determined that the user 11 is not registered for the contents concerned at process ST5 (NO at ST5), the content provider 19 requests the user 11 to perform a registration process in the user menu (ST6). The user's portable telephone 11 displays a registration screen for registering in the user menu information database 35 (ST7). The user 11 performs the registration process on the registration screen for registering in the user menu information database 35 (ST8). The user's portable telephone 11 transmits the registration screen (user menu information is included) that the user 11 has prepared to the communication carrier 31 (ST9). The communications carrier 31 writes the received user menu information into the user information database 35 (ST10), then, a screen provided by the content provider 19 is displayed on the screen of the user's portable telephone 11 (ST11), and the process returns to ST3 wherein presence of a menu registration identifier is examined. At this time, the user identification information, content identifier, and menu registration identifier of the user's portable telephone 11 are provided to the content provider 19. Hereafter, the content services are provided to the user like the case wherein it is determined that the menu registration identifier is contained in the content-requesting signal at the process ST3 (YES at ST3).

Then, the communication carrier 31 can add the content charges to the portable telephone service charge of the user's portable telephone 11 for preparing an invoice, using the user menu information database 35 and the access log information database 37.

Therefore, according to the embodiment, regardless of the presence of registration in the user menu information database 35 of the content provider 19 of the used content services, the user can use the proxy payment service.

Figure 5:
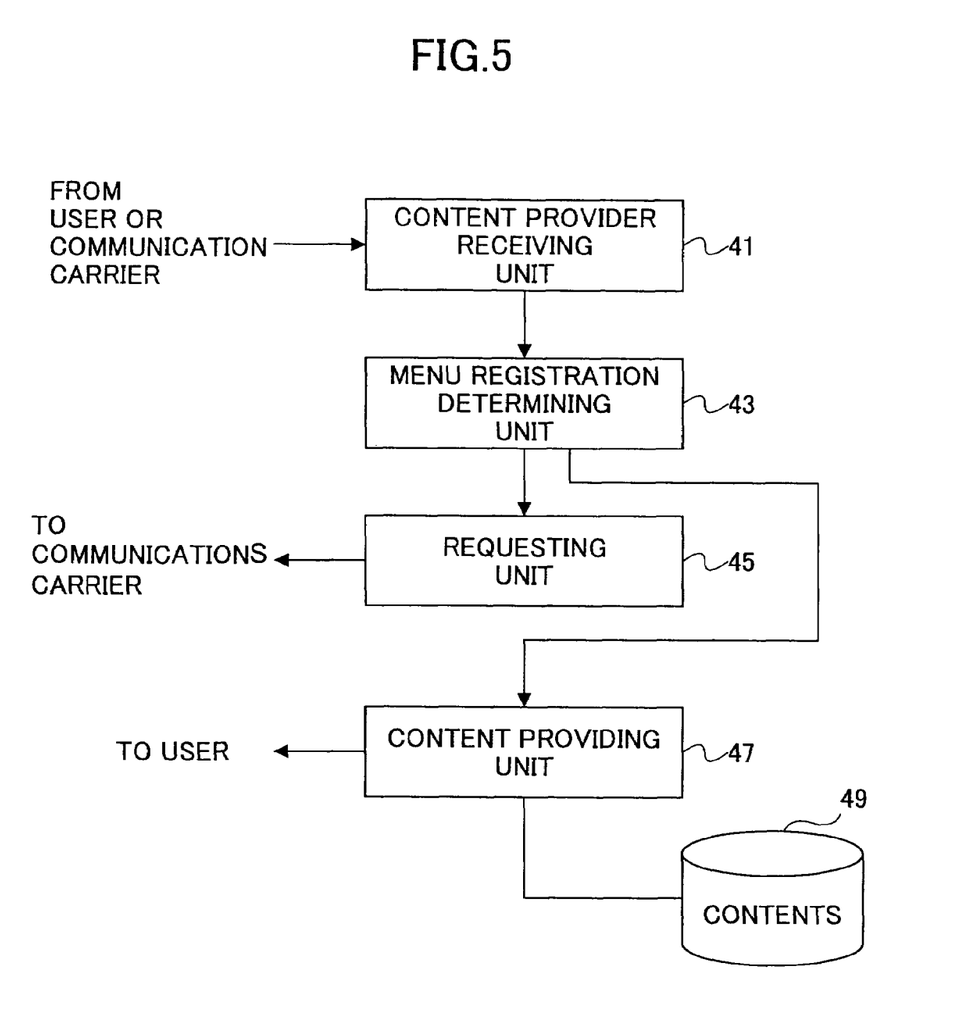
FIG. 5 is a flow diagram for explaining an example of a structure at a content provider.

An example of the main structure of the content provider 19 is explained using FIG. 5. The content provider 19 of FIG. 5 includes a content provider receiving unit 41, a menu identifier determining unit 43, a requesting unit 45, a content providing unit 47, and content 49.

The content provider receiving unit 41 receives a signal requesting a content service of the content provider 19, which is transmitted by the user's portable telephone 11, and a signal that includes a menu identifier, which is transmitted by the communications carrier 31. The menu identifier determining unit 43 determines whether the menu identifier is contained in the content-requesting signal transmitted by the user's portable telephone 11 and the signal transmitted by the communications carrier 31. The requesting unit 45 requests the communications carrier 31 to perform registration processing if the user 11 is not registered in the user menu information database 35, when menu identifier determining means of the menu identifier determining unit 43 determine that the menu identifier is not contained in the received signal. The content providing unit 47 provides the user 11 with content services, when the menu identifier means of the menu identifier determining unit 43 determine that the menu identifier is contained in the received signal.

Figure 6:
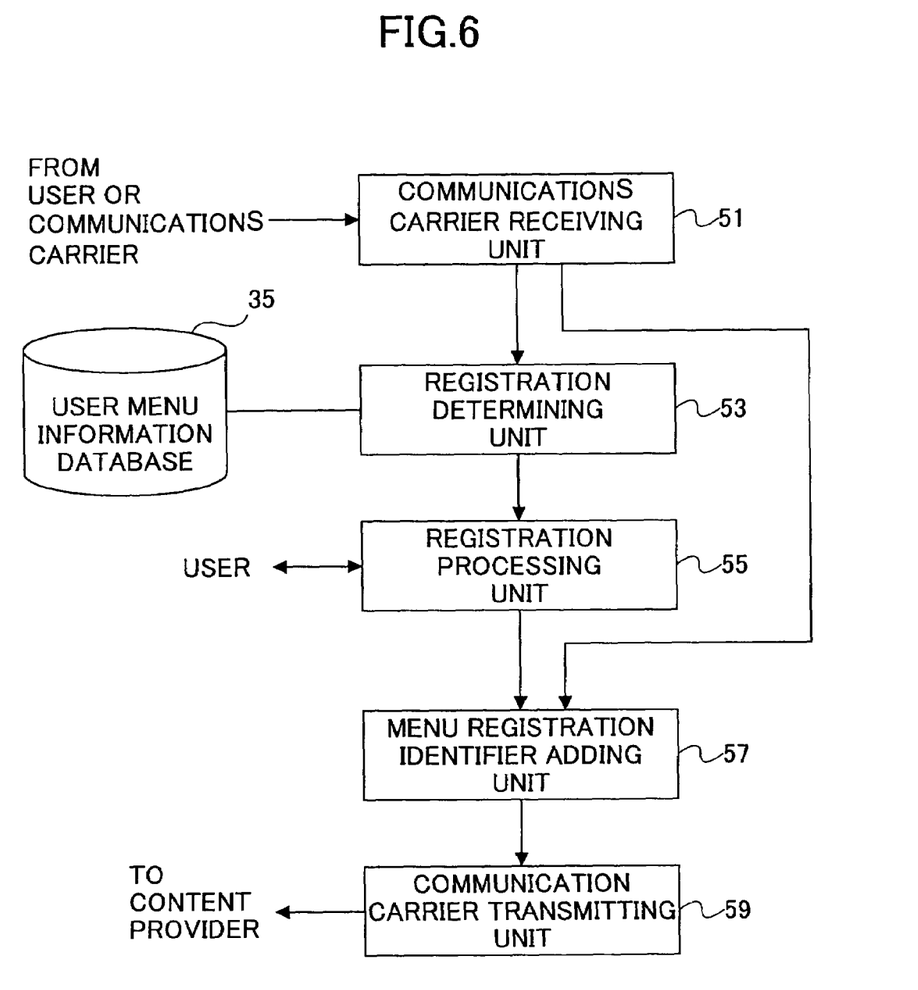
FIG. 6 is a flow diagram for explaining an example of a communications carrier.

An example of the main structure of the communications carrier 31 is explained using FIG. 6. The communications carrier 31 of FIG. 6 includes a communications carrier server receiving unit 51, a registration determining unit 53, a registration processing unit 55, a menu registration identifier adding unit 57, a communications carrier transmitting unit 59, and the user menu information database 35.

The communications carrier server receiving unit 51 receives signals such as the content-requesting signal transmitted by the user's portable telephone 11, and the registration request signal transmitted by the content provider 19 in the case where the user 11 is not registered in the user menu information database 35. The registration determining unit 53 determines whether the user 11 is registered in the user menu information database 35. If it is determined that the user 11 is not registered in the user menu information database 35, the registration processing unit 55 performs the registration process for the user 11. The menu registration identifier adding unit 57 adds a menu registration identifier to the content-requesting signal transmitted by the user's portable telephone 11, and the user identification information and the content identifier transmitted by the content provider 19. The communications carrier transmitting unit 59 transmits the signal to a content provider 19.

Since, according to the embodiment, the registration screen is displayed on the screen of the user's portable telephone 11 and invites the user 11 to register only when the user's portable telephone 11 is not registered in the user menu information database 35 of the communications carrier 31, there is no wasted effort in registration processing.

In addition, although above explanation is provided for a user's portable telephone, the present invention is not limited to it, but also applicable to a portable unit of a PHS (Personal Handy-phone System), a personal digital assistant, and a generic personal computer, for example.

Further, although FIG. 3 does not show a content provider menu information database, it does not mean that the communications carrier does not have a content provider menu information database. Illustration is omitted simply because it is not necessary for explaining the present invention.

As described above, according to the present invention, the limitation of the content services for which a user can use the proxy payment service is eliminated, and useless operations by the user are dispensed with.

What is claimed is:

1. A content providing method of a content provider connecting to a communication carrier which conducts a proxy payment for the content provider, said content providing method comprising:

receiving a content-requesting signal directly from a user's portable telephone;

acquiring a menu registration identifier from the communication carrier when the content-requesting signal does not include the menu registration identifier, which menu registration identifier indicates that the users portable telephone is registered for the requested content service in a user menu information database of the communications carrier, content-requesting;

suppressing the acquiring the menu registration identifier when the content-requesting signal includes the menu registration identifier, wherein said content-requesting signal is transmitted when the user selects one content from a list of at least one content only which the user's portable telephone has been registered from a regular menu including contents which will be available after a registration; and the menu registration identifier allows providing the requested content service directly from the content provider to the user's portable telephone and renders a separate authentication process unnecessary; and providing the requested content service to the user's portable telephone.

2. The content providing method as claimed in claim 1, comprising:

requesting a communications carrier to register a users portable telephone in a user menu information database, when a menu registration identifier, which menu registration identifier indicates that the users portable telephone is registered in the user menu information database of the communications carrier for a requested content service, is not contained in a content-requesting signal transmitted from the users portable telephone to the content provider.

3. A registration method of a user menu information database of a communications carrier which conducts a proxy payment for a content provider providing a content service, said registration method, comprising:

receiving an acquisition request of a menu registration identifier from the content provider;

generating the menu registration identifier by displaying a registration screen letting a user of a portable telephone register in the user menu information database in response to the acquisition request of the menu registration identifier;

adding the menu registration identifier to a content-requesting signal, which content-requesting signal contains user identification information and a content identifier received from the content provider when the user completes registration, and transmitting the content-requesting signal to the content provider;

wherein the content provider requests the menu registration identifier pursuant to receiving the content-requesting signal from the portable telephone of the user; and the menu registration identifier allows providing the requested content service directly from the content provider to the user's portable telephone.

4. The registration method for the user menu information database as claimed in claim 3, wherein the menu registration identifier is added to the content-requesting signal, which content-requesting signal contains the user identification information and the content identifier received from the content provider, and the content-requesting signal is transmitted to the content provider if the user is registered in the user menu information database.

5. A computer readable medium encoded or embodied with a content providing program that is executable by a computer as a content provider connecting to a communication carrier which conducts a proxy payment for the content provider, said content providing program, comprising:

a receiving step for receiving a content-requesting signal transmitted by a user's portable telephone directly from the user's portable telephone, a menu identifier determining step for determining whether the content-requesting signal contains a menu registration identifier that indicates that the user's portable telephone is registered in a user menu information database that registers users of content services, the user menu information database being prepared by a communications carrier, acquiring the menu registration identifier from the communication carrier when the content-requesting signal does not include the menu registration identifier;

suppressing the acquiring the menu registration identifier when the content-requesting signal includes the menu registration identifier, and a content-providing step for providing the user's portable telephone with the content service when the menu identifier determining step determines that the menu registration identifier is contained in the content-requesting signal;

wherein said content-requesting signal is transmitted when the user selects one content from a list of at least one content only which the user's portable telephone has been registered from a regular menu including contents which will be available after a registration; and the menu registration identifier allows providing the requested content service directly from the content provider to the user's portable telephone.

6. A computer readable medium encoded or embodied with a content providing program that is executable by a computer, comprising:

a receiving step for receiving a content-requesting signal transmitted by a user's portable telephone directly from the user's portable telephone, a menu identifier determining step for determining whether the content-requesting signal contains a menu registration identifier that indicates that the user's portable telephone is registered in a user menu information database that registers users of content services, the user menu information database being prepared by a communications carrier, wherein the menu registration identifier allows providing the requested content service directly from the content provider to the user's portable telephone, acquiring the menu registration identifier from the communication carrier when the content-requesting signal does not include the menu registration identifier;

suppressing the acquiring the menu registration identifier when the content-requesting signal includes the menu registration identifier, a content-providing step for providing the user's portable telephone with the content service when the menu identifier determining step determines that the menu registration identifier is contained in the content-requesting signal; and a requesting step for requesting registration of the user' portable telephone in the user menu information database of the communications carrier when the menu identifier determining step determines that the menu registration identifier is not contained in the content-requesting signal.

7. A computer readable medium encoded or embodied with a content requesting program of a communications carrier which conducts a proxy payment for a content provider providing a content service, said registration method, the program being computer-executable, comprising:

receiving an acquisition request of a menu registration identifier from the content provider;

generating the menu registration identifier by displaying a registration screen letting a user of a portable telephone register, in the user menu information database in response to the acquisition request of the menu registration identifier;

a transmitting step for adding the menu registration identifier, which menu registration identifier indicates that a user is registered in a user menu information database, to a content-requesting signal that requests a content service from the content provider, the content-requesting signal being transmitted by the user accessing the content service by selecting a desired content service from a content services list displayed on a user menu; and transmitting the content-requesting signal to the content provider;

wherein said content-requesting signal is transmitted when the user selects one content from a list of at least one content only which the user's portable telephone has been registered from a regular menu including contents which will be available after a registration; and the menu registration identifier allows providing the requested content service directly from the content provider to the user's portable telephone.

8. A computer readable medium encoded or embodied with a user registration program of a communications carrier conducting a proxy payment for a content provider providing a content service, which is computer-executable, comprising:

a registration request processing step for a content provider requesting that a user's portable telephone be registered in a user menu information database, the content provider receiving a content-requesting signal from the user's portable telephone, a registration step for registering the user's portable telephone in the user menu information database, receiving an acquisition request of a menu registration identifier from the content provider;

generating the menu registration identifier by displaying a registration screen letting a user of a portable telephone register, in the user menu information database in response to the acquisition request of the menu registration identifier; and a transmitting step for adding the menu registration identifier to the content-requesting signal, which content-requesting signal contains user identification information and a content identifier received from the content provider, and transmitting the content-requesting signal to the content provider, wherein the menu registration identifier allows providing the requested content service directly from the content provider to the user's portable telephone.

9. The user registration program of the communications carrier as claimed in claim 8, wherein the transmitting step adds the menu registration identifier to the content-requesting signal, which content-requesting signal contains the user identification information and the content identifier received from the content provider, without performing registration request processing of the user's portable telephone, and transmits the content-requesting signal to the content provider if the user's portable telephone is already registered in the user menu information database.

10. A computer readable medium encoded or embodied with an invoicing program of the communications carrier, wherein an access log information database is installed for collecting logs about communications and use of the content services, further comprising:

a step for adding content charges to communication charges of the user's portable telephone with reference to the access log information database and the user menu information database, the user menu information database registering the user's portable telephone using the user registration program according to claim 8 or claim 9.

11. The content providing method as claimed in claim 2, further comprising:

receiving the content-requesting signal from the communication carrier to the content provider when the communication carrier has completed registering the user's portable telephone in the user menu information database of the communication carrier.

* * * * *

UNITED STATES PATENT AND TRADEMARK OFFICE
CERTIFICATE OF CORRECTION

| | | |
|---|---|---|
| PATENT NO. | : 7,457,610 B2 | |
| APPLICATION NO. | : 10/647650 | |
| DATED | : November 25, 2008 | |
| INVENTOR(S) | : Naohito Takae (deceased) by his representative, Yumiko Takae (heiress) et al. | |

It is certified that error appears in the above-identified patent and that said Letters Patent is hereby corrected as shown below:

Page 1, Column 1, under "U.S. 2004/0081300 A1  Apr. 29, 2004" insert
--Related U.S. Application Data
(63) Continuation of application No. PCT/JP01/09443, filed on Oct. 26, 2001.--.

Column 10, Line 28, before "portable" change "users" to --user's--.

Column 10, Line 48, change "users" to --user's--.

Column 10, Line 51, before "portable" change "users" to --user's--.

Column 10, Line 55, before "portable" change "users" to --user's--.

Column 12, Line 16, change "user'" to --user's--.

Signed and Sealed this

Third Day of March, 2009

JOHN DOLL
*Acting Director of the United States Patent and Trademark Office*

UNITED STATES PATENT AND TRADEMARK OFFICE
CERTIFICATE OF CORRECTION

| | |
|---|---|
| PATENT NO. | : 7,457,610 B2 |
| APPLICATION NO. | : 10/647650 |
| DATED | : November 25, 2008 |
| INVENTOR(S) | : Naohito Takae (deceased) by his representative and Yumiko Takae (heiress) et al. |

It is certified that error appears in the above-identified patent and that said Letters Patent is hereby corrected as shown below:

On the Title Page, insert Item (30)

-- (30) Foreign Application Priority Data
Feb. 28, 2001 (JP).....................2001-055736 --.

Signed and Sealed this

Fifteenth Day of September, 2009

David J. Kappos
*Director of the United States Patent and Trademark Office*